(12) United States Patent
Wright (10) Patent No.: US 11,238,410 B1
(45) Date of Patent: Feb. 1, 2022

(54) METHODS AND SYSTEMS FOR MERGING OUTPUTS OF CANDIDATE AND JOB-MATCHING ARTIFICIAL INTELLIGENCE ENGINES EXECUTING MACHINE LEARNING-BASED MODELS

(71) Applicant: iCIMS, Inc., Holmdel, NJ (US)

(72) Inventor: David Wright, Huntington Station, NY (US)

(73) Assignee: iCIMS, Inc., Holmdel, NJ (US)

( * ) Notice: Subject to any disclaimer, the term of this patent is extended or adjusted under 35 U.S.C. 154(b) by 0 days.

(21) Appl. No.: 16/718,075

(22) Filed: Dec. 17, 2019

(51) Int. Cl.
*G06Q 10/10* (2012.01)
*G06Q 10/06* (2012.01)
*G06Q 30/02* (2012.01)
*G06Q 30/08* (2012.01)
*G06N 20/00* (2019.01)

(52) U.S. Cl.
CPC ......... *G06Q 10/1053* (2013.01); *G06N 20/00* (2019.01); *G06Q 10/063112* (2013.01)

(58) Field of Classification Search
CPC ............ G06Q 10/105; G06Q 10/1053; G06Q 10/063112; G06N 20/00; G06N 5/04
USPC ................................. 705/1.1–912, 320, 321
See application file for complete search history.

(56) References Cited

U.S. PATENT DOCUMENTS

| | | | | |
|---|---|---|---|---|
| 7,502,748 B1* | 3/2009 | Baldwin | ................ | G06Q 10/06 705/7.14 |
| 7,720,791 B2* | 5/2010 | Hyder | ............ | G06Q 10/063112 705/7.14 |
| 7,805,382 B2* | 9/2010 | Rosen | ................ | G06Q 10/1053 705/321 |
| 7,827,117 B2* | 11/2010 | MacDaniel | ............ | G06Q 30/08 705/321 |
| 8,001,064 B1* | 8/2011 | Rennison | ............... | G06F 16/319 706/14 |
| 8,745,083 B1* | 6/2014 | Ruiz | ................... | G06Q 10/1053 707/770 |
| 2003/0200136 A1* | 10/2003 | Dewar | ........... | G06Q 10/063112 705/7.32 |
| 2006/0178896 A1* | 8/2006 | Sproul | ................... | G06Q 10/10 705/321 |
| 2008/0104071 A1* | 5/2008 | Pragada | ............ | G06F 16/24522 |
| 2009/0070133 A1* | 3/2009 | Bonilla | ................... | G06Q 10/10 705/1.1 |
| 2009/0164311 A1* | 6/2009 | Deyo | ..................... | G06Q 10/06 705/7.13 |
| 2011/0022530 A1* | 1/2011 | Bogle | .................... | G06Q 10/00 705/321 |
| 2014/0122355 A1* | 5/2014 | Hardtke | ............... | G06Q 10/105 705/321 |
| 2015/0006422 A1* | 1/2015 | Carter | ................ | G06Q 10/1053 705/321 |
| 2015/0134388 A1* | 5/2015 | Yoo | ................ | G06Q 10/063112 705/7.14 |

(Continued)

*Primary Examiner* — Jonathan P Ouellette
(74) *Attorney, Agent, or Firm* — Cooley LLP (57) ABSTRACT

The instant disclosure discloses methods and systems for merging outputs of matching artificial intelligence (AI) engines that are configured to match jobs to candidates, candidates to candidates and jobs to jobs. The methods and systems illustrate how multiple artificial intelligence engines or algorithms executing machine learning-based models can be used to identify candidates or jobs that match other candidates or jobs.

10 Claims, 2 Drawing Sheets

(56) References Cited

U.S. PATENT DOCUMENTS

| | | | |
|---|---|---|---|
| 2015/0235181 A1* | 8/2015 | Chen | G06Q 10/1053 |
| | | | 705/321 |
| 2015/0248647 A1* | 9/2015 | Goel | G06Q 10/1053 |
| | | | 705/321 |
| 2015/0317606 A1* | 11/2015 | Bubna | G06Q 10/1053 |
| | | | 705/321 |
| 2016/0321614 A1* | 11/2016 | Leslie | G06Q 10/1053 |
| 2017/0032322 A1* | 2/2017 | Grover | G06Q 10/1053 |
| 2018/0060822 A1* | 3/2018 | Hou | G06Q 10/1053 |
| 2018/0232421 A1* | 8/2018 | Dialani | G06F 15/76 |

\* cited by examiner

FIG. 1

METHODS AND SYSTEMS FOR MERGING OUTPUTS OF CANDIDATE AND JOB-MATCHING ARTIFICIAL INTELLIGENCE ENGINES EXECUTING MACHINE LEARNING-BASED MODELS

FIELD OF THE DISCLOSURE

The instant disclosure discloses methods and systems for merging outputs of matching artificial intelligence (AI) engines that are configured to match jobs and candidates. The methods and systems illustrate how multiple artificial intelligence engines or algorithms executing machine learning-based models can be used to identify candidates or jobs that match other candidates or jobs, and how such matched candidates and jobs are further filtered to return a merged list of candidates or jobs. The filtering techniques are configured to balance the need to identify a broad set of candidates or jobs from which to choose a candidate or a job and the interest in identifying the candidate or job as efficiently and accurately as possible.

BACKGROUND

Employers seeking to hire employees advertise their job openings in job postings that list, among other things, the employers' requirements for prospective employees that wish to apply for the job openings. Examples of such requirements include education level requirements, experiences related to the job, skills required or expected to perform the job, etc. The job listings can also include other relevant information such as but not limited to the title of the job, the seniority levels of the job, etc. Similarly, employees looking for a job include in a resume or curriculum vitae their skills, education and professional experiences, etc.

DETAILED DESCRIPTION

In some embodiments, a job listing can include descriptions of a job providing details on the employer's requirements or expectations for a candidate that is interested in applying for the job. That is, the job listing can include several job attributes in the job descriptions, examples of which may include the title of the job, skill levels required or expected to perform the job, location(s) of the job, seniority level of the job, expected or required education and experience levels, etc. Candidates interested in applying for a job also list or describe their qualifications such as but not limited to educational experiences, professional experiences, skills (e.g., language skills, proficiencies in tools used in performing the job, etc.) in resumes or curriculum vitae (CV). Resumes or CV(s) can also include additional relevant information such as the locations of the candidates, dates the candidates are available for jobs, etc.

In trying to identify a set of candidates that are suitable for a job, or vice versa, one may compare the descriptions in job listings to resumes or CV(s) of candidates to identify matches based on some predetermined match metric or attribute. For example, a matching artificial intelligence (AI) engine or algorithm that is configured to analyze attributes such as job titles (e.g., job titles both in the job listing and resumes/CV(s)) and make determination about candidate-job matches, may determine that a job and a candidate are a match based on the title of the job in the job listing and titles of jobs the candidate has had (e.g., as listed in a resume or CV). In some implementations, the matching AI engines or algorithms may employ machine learning-based models in performing the noted analysis. Similarly, a matching AI engine or algorithm that is configured to analyze attributes such as job skills (e.g., job skills both in the job listing and resumes/CV(s)) and make determination about candidate-job matches may determine that the job and the candidate are a match based on the skills required or expected for the job and job skills the candidate possesses. It is to be noted that the above examples (related to job titles and skills) are non-limiting examples, and that matching AI engines or algorithms can make determinations of matches between candidates and jobs based on other attributes such as but not limited to seniority levels, locations, experience, etc. The standards to be used in making such determinations can be varied based on the requirements of the job or candidate search. For example, the matching standards can be lower if an employer wants a large number of candidates (e.g., a broad-based search to identify as many job candidates as possible to fill a job that has been open for a long time). As another example, the matching standards can be higher if an employer searching for a candidate has specific demands (e.g., specific skills or knowledge, college degree, experience with specific tools or processes, etc.).

In some embodiments, job descriptions (e.g., in job listings) and candidate descriptions (e.g., in candidate resumes/CV(s)) may be parsed and analyzed to extract job data and candidate data, respectively, that may be used in identifying matching candidates and jobs as described above. Jobs can be represented by job descriptions as presented on career sites or job boards, and are usually written from the perspective of the hiring company with business processes and nomenclature that may not be universally used or understood. Candidates may represent themselves via resumes/CV(s) that are usually written by the candidates or their agents who choose to list or highlight a subset of experiences or skills. In some cases, the candidates may also be represented by social media profiles (e.g., LinkedIn® or Facebook® profiles) which may contain relevant information that supplement their resumes/CV(s). In general, these job descriptions as well as candidate descriptions (e.g., social media profiles, resumes/CV(s), etc.) may be presented in language and form that may not be standard across all or even most industries, and the matching AI engines may have to parse the job and candidate descriptions to extract job data and candidate data, respectively, for use in identifying matching candidates and jobs.

For example, a job description may be written from the perspective of a company hiring manager and recruiter, and may include vaguely worded or ambiguous job requirements (e.g., "must be a team player"). For instance, specific skill needs may or may not be included, and the description may not state clearly whether the skills are required or desired. Further, job titles can also be written from an internal company perspective, using nomenclature that may not be standard and may in fact be nebulous (e.g., "looking for a ninja!"). Seniority terms in the description and title may be written vaguely, and even when explicit (e.g., "3-5 years' experience") may be inaccurate or misleading if the company is willing to accept less or more experience. In addition, job descriptions may include boilerplate company needs that may be secondary to the candidate job description. Similarly, resumes/CV(s) as well as social media profiles may contain information written from the perspective of the candidate using language or terminology that may not be standard (e.g., written in terms of the candidate's previous employment experience or social community), and hence not understood by a large set of prospective employers.

In some implementations, matching AI engines or algorithms may parse the job descriptions in job listings and/or the candidate descriptions in resumes/CV(s), social media profiles, etc., to extract job data and candidate data, respectively, that may be used to identify matching candidates and jobs. For example, the matching AI engines may employ natural language processing (NLP) techniques to extract the noted job data and candidate data. For instance, if a resume/CV is in an image format (e.g., portable document format (PDF)), the matching AI engine may perform optical character recognition (OCR) to detect texts, and analyze the texts in context of the entire document to extract candidate data such as but not limited to candidate skill sets, candidate education levels, time candidate has spent in the workforce, etc. As another example, a job description may be part of a posting to a social media account of an employer, and a matching AI engine may analyze the texts of the post (e.g., in the context of the fact that the job listing is a social media post (and not, for example, a job listing in a job board)) to detect and extract the job data.

In some implementations, the extracted job data and candidate data may be augmented with relevant information so that the job and candidate data includes information that is related to the job or candidate descriptions but not included in the job or candidate data. For example, the extracted job or candidate data may be augmented with synonyms of terms that are in the extracted job or candidate data, as the synonyms are related information that facilitates or enhances the matching AI engines' ability to identify matching jobs and candidates. For instance, a candidate's resume/CV may state that the candidate is a medical doctor specializing in cardiology. In such cases, the extracted candidate data may be augmented with synonyms of terms in the resume/CV so that extracted candidate data includes the term "physician" (as a synonym to "medical doctor"), "heart doctor" (as a synonym to a "medical doctor specializing in cardiology"), etc. In some implementations, the extracted candidate or job data may also be augmented with information related to the extracted candidate or job data (which may or may not be synonyms to terms in the extracted candidate or job data). For example, with reference to the above-identified example, the extracted candidate or job data may be augmented with information indicating that the candidate has a fellowship in cardiology, as specializing in a subject may be understood in the candidate's professional field as having a fellowship in the subject.

As another example, the extracted job or candidate data may include skills information, i.e., skills required or expected to perform the job or skills possessed by the candidate. In such cases, the matching AI engine or algorithm may augment the extracted job or candidate data with additional skills that are implicit to the explicit skills information in the extracted job or candidate information. For instance, such implicit skills can be skills needed to use tools that are required for performing tasks for which the explicit skills are needed or required. For example, an extracted candidate data may include information about the candidate having worked as a life guard in a previous job. Such extracted candidate data may then be augmented so that the extracted candidate data includes the implicit skill of the candidate's ability to swim.

Other examples include augmenting the job or candidate data with information that, although not present in the job or candidate descriptions, may be useful in generating extracted job data or candidate data that facilitate the identification of matching candidates and jobs. For example, a job may not include seniority level of the candidate, and a matching AI engine or algorithm may augment the extracted candidate data with such information (e.g., information related to the seniority level of the candidate as can be deduced based on other information in the candidate descriptions) so that the extracted data facilitates the identification of matching candidates and jobs by the matching AI engine or algorithm. For instance, an extracted candidate data may include the information that the candidate is a lawyer, and based on other information in the candidate's description (e.g., information indicating that the candidate is a recent graduate), the matching AI engine or algorithm may augment the extracted candidate data with the information that the seniority level of the candidate is an associate. Augmenting the extracted job or candidate data with relevant information that is not present in the job or candidate descriptions and as such not already included in the extracted job or candidate data can in particular be beneficial when the job or candidate descriptions are vague or use terminology or nomenclature that may not be standard. As such, after extracting job and candidate data from job and candidate descriptions, respectively, and augmenting such data with relevant auxiliary information, a matching AI engine or algorithm may then use the extracted augmented data to identify matches between candidates and jobs.

In some implementations, a matching AI engine can make matching determination (e.g., of candidates and/or jobs) based on one or more attributes of the jobs and candidates in the extracted augmented job and/or candidate data. For instance, the same matching AI engine can make matching determinations based on job titles, job skills, etc. In some implementations, some matching AI engines are configured to produce more accurate results when matching candidates or jobs based on one attribute rather than based on another attribute. For example, matching results from a first matching AI engine may provide more accurate matches when the match is done based on job title attributes, as opposed to, for example, skills attributes (such a matching AI engine or algorithm may be understood as being configured to perform candidate or job matching based on job title attributes, even though the matching AI engine or algorithm may be configured to perform matchings based on other attributes (e.g., skills), although with less accurate results). In contrast, another matching AI engine may provide more accurate matches when the match is done based on job skill attributes as opposed to job title attributes (such a matching AI engine or algorithm may be understood as being configured to perform candidate or job matching based on skills attributes, even though the matching AI engine or algorithm may be configured to perform matchings based on other attributes (e.g., job titles), although with less accurate results). As another example, another matching AI engine or algorithm may be configured to provide more accurate matches when the match is done based on multiple attributes (e.g., based on two attributes such as both job title attributes and job skills attributes). One may then merge the match results of such different matching AI engines or algorithms (e.g., two or more matching AI engines or algorithms (e.g., three matching AI engines or algorithms)) to identify match results that are more accurate than match results that would be obtained from a single engine or algorithm, or less number of engines or algorithms. In some implementations, the comparative term "more accurate matches" may refer to matches that an employer or employee (or agents thereof) understands or confirms as being more accurate after manual examination of the results of the matching AI engine or algorithm.

In some implementations, the match results of the different matching AI engines or algorithms may have low correlations. That is, even though two or more engines may identify a candidate-job pair as being a match, the two or more engines may determine that the candidate-job pair has different levels of matching. For example, a first engine may identify a given candidate-job pair as being highly matched. That is, the first engine may associate an indication of matching with the candidate-job pair to indicate the level of matching in relation to some benchmark matching level (e.g., a high cardinal score is assigned indicating a high level of matching) or in relation to the matching level of other matched candidate-job pairs (e.g., the candidate-job pair appears as one of the top results of matched candidate-job pairs). A second engine may identify the same given candidate-job pair as being lowly matched. That is, an indication of matching may be associated with the candidate-job pair to indicate the level of matching in relation to some benchmark matching level (e.g., a low cardinal score may be assigned indicating a low level of matching) or in relation to the matching level of other matched candidate-job pairs (e.g., the candidate-job pair may appear as one of the bottom or low results of matched candidate-job pairs). A level of matching determined by a matching AI engine for a candidate-job pair may be understood as a measure of, or a predicted probability of, the suitability of the candidate for the job (and vice versa) based on the job and candidate descriptions.

In some implementations, whether or not two matching AI engines or algorithms have low correlation may be determined with the use of test data (e.g., test candidate data and test job data). Two matching AI engines or algorithms may be considered to have high correlation if the match results of the applications of the two matching AI engines or algorithms to the test candidate and job data are at least substantially similar (e.g., cardinal scores assigned to a same candidate-job pair by the two matching AI engines or algorithms (based on the same base) are within 10% of each other). For example, the test candidate data may be obtained by parsing the descriptions of qualifications of multiple candidates and the test job data may be obtained by parsing the descriptions of job listings of multiple jobs. In such cases, an application of one of the two matching AI engines or algorithms to the test candidate data and the test job data may generate a first list of candidate-job pairs with assigned cardinal or ordinal scores, each score indicating the level of matching between a candidate and job of a candidate-job pair. The second of the two matching AI engines or algorithms may considered to be highly correlated with the first matching AI engine or algorithm if a list of candidate-job pairs generated by the application of the second matching AI engine or algorithm to the same test candidate data and test job data is substantially similar to the first list generated by the first matching AI engine or algorithm. That is, the first list and the second list include a large number of candidate job pairs with at least substantially similar ordinal and/or cardinal scores. For example, the ordinal and/or cardinal scores in the two lists (based on the same base) of at least a majority of the candidate-job pairs may be at least substantially similar, indicating that the two matching AI engines or algorithms that generated the two lists are highly correlated. If the ordinal and/or cardinal scores in the two lists (based on the same base) of at least a majority of the candidate-job pairs are at least substantially different, then the two matching AI engines or algorithms that generated the two lists may be understood as being are lowly correlated.

As a non-limiting illustrative example, in some embodiments, one may apply three matching AI engines or algorithms on the extracted and augmented job and candidate data to match one or more jobs with one or more candidates so as to identify matches between the jobs and candidates. In such example, each engine may produce match results based on one predominate attribute. For example, each engine may produce match results based primarily on one of the following attributes: job titles, skills, seniority levels, job locations, education levels, experience levels, and/or the like. For instance, one of the engines or algorithms may process the extracted augmented job and candidate data to produce more accurate match results when the matching is done based on job title attributes (e.g., the match engine or algorithm may use a title matching ontology built using multiple years of historical job data). The second engine or algorithm may extract skills information (e.g., by parsing job listings as well as resumes/CV(s)) so as to produce more accurate results when the matching is performed based on skill attributes. The third engine or algorithm may produce more accurate matches (e.g., compared to the first and the second engines or algorithms) when the matching is done based on job title attributes and job skills attributes (e.g., the third engine or algorithm may produce, however, less accurate results compared to the first or second engine or algorithm when the matching is performed based on job title or job skills attributes, respectively). In some implementations, additional engines or algorithms may be used as well, including engines or algorithms configured to perform matchings (i.e., process the augmented job and candidate data to identify matching candidates and jobs) based on other attributes such as seniority levels, job locations, etc.

In some implementations, once the match results of multiple matching AI engines are provided or obtained, the match results may be merged to identify a set of candidate-job pairs that may be deemed to be the best matches based on the attributes on which the multiple engines perform matchings. As noted above, each engine or algorithm of the multiple engines or algorithms may process the extracted job data and candidate data (e.g., data extracted from descriptions ofjobs and candidates and further augmented with relevant auxiliary information) based on one or more attributes to generate a set or list of candidate-job pairs that that engine or algorithm identifies as matching pairs (based on the one or more attributes). For example, a job title matching AI engine or algorithm that processes the extracted data based on job title attributes may identify a set of candidate-job pairs that may be considered as matches (i.e., matches based on job titles). As discussed in detail above, different engines may process the extracted data based on different predominate attributes, such attributes including skills, seniority, education level, job locations, etc., and a combination thereof, to identify a set or list of candidate-jobs pairs that may be considered to be matches based on those different attributes. In some implementations, the list may be ordered, i.e., the candidate-job pairs may be listed in order of increasing or decreasing matching levels. For example, an engine or algorithm that matches candidates and jobs based on job title attributes can provide a match result that includes a list of candidate-job pairs that are ordered in decreasing level of job title match levels (i.e., the pairs are ordinally-ordered or ranked). In some implementations, the lists may be cardinally-ranked. That is, there may be a cardinal score assigned to each pair identifying the relative level of matching of a given pair in a list compared to another pair in the list. For example, an engine or algorithm that matches candidates and jobs based on job skill attributes can provide a match result that includes a list of candidate-job pairs that are ordered in increasing or decreasing level of skill match levels. Further, there may be a cardinal score assigned to each candidate-job pair indicating the relative level of matching between the candidate and job of that candidate-job pair in relation to other candidate-job pairs in the same list.

In some implementations, once the multiple engines or algorithms identify sets of candidate-job pairs as matches, one may want to further process the sets to identify the candidate-job pairs that are better matched compared to other candidate-job pairs in the same set. For example, the result of a job title matching AI engine or algorithm may identify a large number of candidate-job pairs as matches, with the relative level of matching indicated by ordinal ranks or cardinal scores associated with the matched pairs. An example of the former can be a listing of the matched pairs in decreasing order of matching (e.g., being first on the list indicating best match while being last indicating worst match) while an example of the latter can be scaled scores ranging from a maximum of 100 (for best match) to a minimum of 0 (for worst match). In such cases, for the results of each type of matching AI engine or algorithm, one may want to retain the highly matched pairs and discard the lowly matched ones so that the highly matched pairs can be used in identifying an ultimate set of candidate-job pairs that may be considered to be matches based on all attributes, as discussed below.

For example, in some implementations, for each set of match results, a minimum threshold (of ordinal rank for ordinally-ranked list or cardinal score for cardinally-ranked list) may serve to delineate the candidate-job pairs that are strongly matched from the candidate-job pairs that are weakly matched. In such cases, the candidate-job pairs that have ordinal rank or cardinal score no less than the minimum threshold may be used to identify the above-noted highly matched set of candidate-job pairs, while those candidate-job pairs with ordinal rank or cardinal score less than the minimum threshold may be discarded. As such, each match engine or algorithm may identify a set that includes a list of highly-matched candidate-job pairs that can be used in identifying an ultimate merged set of candidate-job pairs that may be considered to be matches based on all attributes, as discussed below.

In some embodiments, the ultimate merged set of candidate-job pairs that may be considered to be matches based on all attributes may be formed by selecting those candidate-job pairs that are present in a subset (e.g., at least majority) of the multiple lists of highly-matched candidate-job pairs. In other words, the ultimate set of candidate-job pairs includes those candidate-job pairs that are effectively voted as being matches by the subset (e.g., at least majority) of the matching AI engines or algorithms (e.g., since those pairs were identified as highly matched pairs by at least a majority of the engines or algorithms). In some implementations, the voting may be weighted. That is, a given candidate-job pair appearing in the match results of one matching AI engine or algorithm may be given more weight than if the pair appeared in a match result of a different matching AI engine or algorithm.

As a non-limiting illustrative example, three matching AI engines or algorithms may process extracted candidate and job data obtained by parsing job descriptions of multiple job listings and candidate descriptions of multiple resumes/CV(s), social media profiles, etc. The processing of the extracted data by the three engines or algorithms each may be based on one predominate different attribute, such an attribute chosen from job title attributes, skills attributes, job seniority attributes, job location attributes, etc., and combination thereof. For instance, a job-title matching AI engine or algorithm may perform a matching analysis between the extracted job data and the extracted candidate data to identify candidate-job pairs that may be considered to be matches based on the job title attribute. In some implementations, these candidate-job pairs may be listed in a cardinal list. That is, each candidate-job list may be assigned a score that quantifies its level of matching with respect to other candidate-job pairs in the same list. In some implementations, the candidate-job pairs may be listed in an ordinal list where the position of a given candidate-job pair in the list indicates the level of matching of that particular pair with respect to other candidate-job pairs in the same list without quantifying the level of matching. For the match results of each matching AI engine or algorithm (e.g., of the three engines or algorithms), in some implementations, one may then identify those candidate-job pairs with a cardinal score or ordinal rank less than that matching AI engine's or algorithm's minimum threshold score or rank, respectively, as the highly matched candidate-job pairs. For instance, if the job title matching AI engine or algorithm identifies a list of cardinally-ranked candidate-job pairs as matches with cardinal scores between 100 (best match) and 0 (worst match), and the minimum threshold for the matching AI engine or algorithm is 60, then all candidate-job pairs with cardinal scores corresponding to 60 or more may be considered as highly- or strongly-matched candidate-job pairs.

In some implementations, after the highly- or strongly-matched candidate-job pairs for each of the three matching AI engines or algorithms (or in general, multiple matching AI engines or algorithms) are identified, then the ultimate set of candidate-job pairs that may be considered to be matches based on at least the predominate attributes (i.e., job title attributes, skills attributes, and combination thereof) of the engines may be determined by merging (e.g., as discussed with reference to FIG. 2) the highly-matched candidate-job pairs of each of the three matching AI engines or algorithms according to a majority rule. That is, the highly-matched candidate-job pairs that are identified by at least a majority of the three matching AI engines or algorithms may be identified as part of the ultimate set of candidate-job pairs that may be considered to be matches based on at least the predominate attributes of the three matching AI engines or algorithms. In some implementations, a matching AI engine may not have an associated minimum cardinal score or ordinal rank threshold. In such cases, all the identified candidate-job pair may be considered in determining or identifying the ultimate set of candidate-job pairs.

It is to be noted that, although the discussions throughout the instant disclosure have focused on identifying matches between candidates and jobs, the discussions are equally applicable to identifying matches between candidates and candidates or jobs and jobs. For example, a first job data may be extracted from a first set of job listings and a second job data may be extracted from a second set of job listings, and a job title matching AI engine or algorithm may process the first job data and the second job data to identify first job-second job pairs that are a match, as described throughout the subject specification with respect to candidate-job pairs. An example application of such cases may be when a job candidate wishes to identify several other jobs (i.e., "a second set of job listings") that match one or more jobs (i.e., "a first set of job listings") in which the candidate is interested. Another example can be when an employer wishes to identify candidates that have resumes/CV(s) that match the resume(s)/CV(s) of a specific candidate or candidates or even current employee(s).

Figure 1:
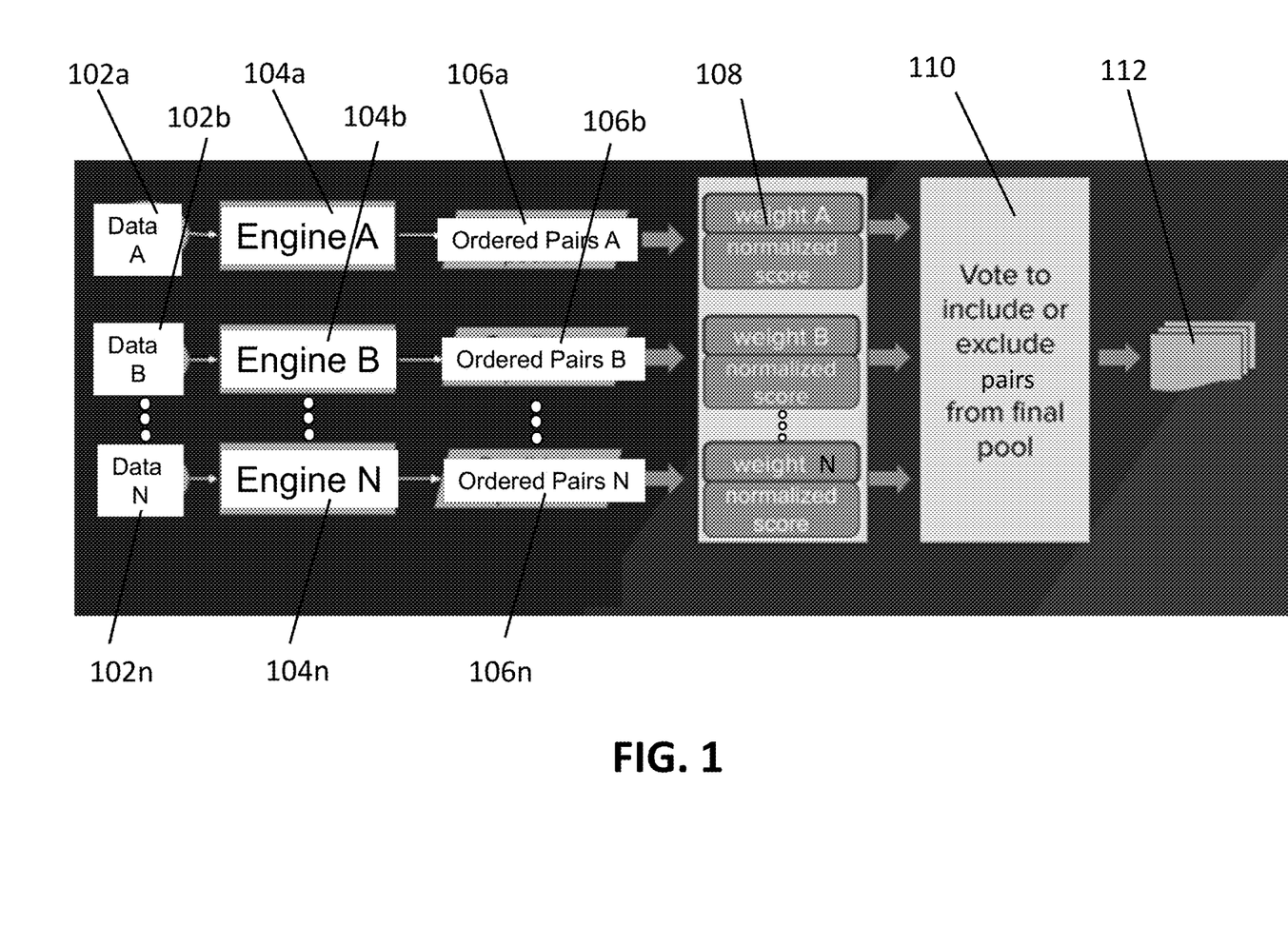
FIG. 1 shows a flow chart illustrating a method of using multiple matching artificial intelligence engines or algorithms to identify, from a set including multiple candidates or jobs, a selection of candidates or jobs that match another set of candidates or jobs, according to some embodiment.

FIG. 1 shows a flow chart illustrating a method of using multiple matching AI engines or algorithms to identify, from a set including multiple candidates or jobs, a selection of candidates or jobs that match a set of candidates or jobs (e.g., which may be a model candidate or job), according to some embodiment. For example, one may wish to identify a set of jobs or candidates that match a given representative or selected job (or jobs) or representative or selected candidate (or candidates). In such cases, one may extract candidate or job data $102a$-$102n$ extracted from descriptions of jobs and/or candidates as discussed above and apply the matching AI engines or algorithms $104a$-$104n$ to extract candidate or job data $102a$-$102n$. In some implementations, the candidate or job data $102a$-$102n$ may all be the same, i.e., they may be data extracted from the same set of job or candidate descriptions. In some implementations, the candidate or job data $102a$-$102n$ may not be the same, but may have overlapping elements as, for example, the job or candidate descriptions from which extracted data A $102a$ and extracted data B $102b$ are extracted may overlap. For example, matching AI engine or algorithm A $104a$ may process extracted data A $102a$ to determine candidate-candidate, candidate-job or job-job matches. As another example, matching AI engine or algorithm A $104a$ may process extracted data A $102a$ to determine candidates and jobs that are matches to a representative candidate or job. In any case, the matching AI engines or algorithms $104a$-$104n$ may then process the candidate or job data $102a$-$102n$ based on varying attributes to determine the candidate-candidate, candidate-job or job job matches or candidates or jobs that are matches to representative or selected candidates or jobs.

The match results for each matching AI engine or algorithm may include a list of ordered pairs $106a$-$106n$ of candidate-candidate, candidate-job or job-job pairs that may be cardinally or ordinally-ranked. In some implementations, these lists may be merged, as discussed with reference to FIG. 2, to identify an ultimate list of matching pairs that may be considered to be matches based on at least the predominate attributes of the matching AI engines or algorithms $104a$-$104n$. For example, the lists of ordered pairs $106a$-$106n$ may be further processed before the ultimate list is formed. For example, the lists of ordered pairs $106a$-$106n$ from different matching AI engines or algorithms $104a$-$104n$ may be assigned varying weights (and the cardinal scores normalized if the cardinal scores for different lists have different bases), e.g., $108$, prior to candidate-candidate, candidate-job or job job pairs that are in at least a majority of the lists of ordered pairs $106a$-$106n$ are added, e.g., $110$, to the ultimate list of matching pairs $112$. For instance, a candidate-candidate, candidate-job or job job pair in the list of ordered pairs $106a$ may be present in each list of the lists of ordered pairs $106a$-$106n$ with associated cardinal scores, where at least some of the associated cardinal scores are different from each other. If the lists of ordered pairs $106a$-$106n$ from the different matching AI engines or algorithms $104a$-$104n$ are weighed equally, then the cardinal score of that candidate-candidate, candidate-job or job-job pair in the ultimate list of matching pairs $112$ may be calculated as the average of the pair's associated cardinal scores. In some cases, for example when the results of some matching AI engines are deemed to be more accurate than others, the associated cardinal scores of a candidate-candidate, candidate-job or job-job pair may be weighed differently, i.e., varying weights may be assigned to the cardinal scores, when calculating the cardinal score of that candidate-candidate, candidate-job or job-job pair in the ultimate list of matching pairs $112$.

Figure 2:
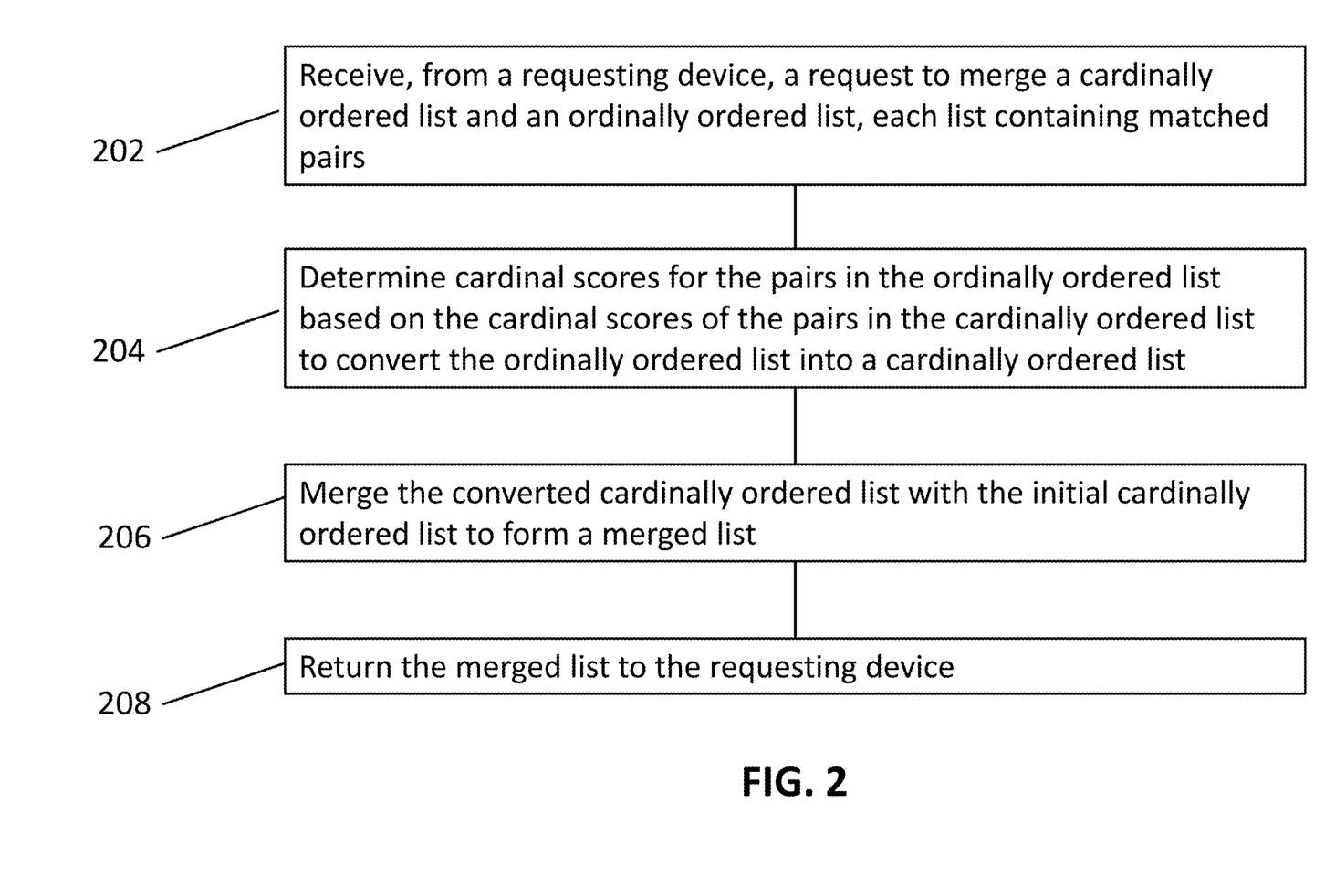
FIG. 2 shows a flow chart illustrating a method of merging ordered results of at least two artificial intelligence engines or algorithms that are configured to produce at least one ordinally-ranked list and at least one cardinally-ranked list, according to some embodiment.

FIG. 2 shows a flow chart illustrating a method of merging ordered results of at least two engines or algorithms that are configured to produce at least one ordinally-ranked list and at least one cardinally-ranked list, according to some embodiment. In some implementations, as discussed above, the lists of matched pairs that are generated by matching AI engines or algorithms may be cardinally or ordinally-ordered. In such cases, to merge these lists (e.g., the lists of ordered pairs $106a$-$106n$), one may have to establish a common base for the ranks of the orders of the lists. For example, if one list is cardinally-ordered with cardinal scores ranging from 0 to 100, while another cardinally-ordered list has cardinal scores ranging from 0 to 10, then the cardinal scores of the two lists may have to be normalized (to a common base), e.g., $108$ in FIG. 1, before the two lists are merged. After normalizing to a common base, in some implementations, the lists may be merged using several merging techniques. For example, for each pair, the average of its cardinal scores from the two lists may be taken as its cardinal score in the merged list. Another example merging technique is the Schulze Method. The Schulze method may also be used when the two lists to be merged have no associated cardinal scores.

In some implementations, one of the lists may be cardinally-ordered and the other list may be ordinally-ordered. In such cases, one method for merging these types of two lists includes assigning evenly-spaced cardinal values to the matched pairs of the ordinally-ordered list to convert the ordinally-ordered list to a cardinally-ordered list and merging the two cardinally-ordered lists as discussed above. The assigned cardinal scores may be normalized to the same base as the base of the cardinal scores of the initial cardinally-ordered list. Another method includes treating the cardinally-ordered list as an ordinally-ordered list (e.g., ignoring the cardinal scores) and merging the two ordinally-ordered lists as discussed above (e.g., via the Schulze Method).

In some implementations, a cardinally-ordered list and an ordinally-ordered list may be merged by using the cardinal scores of the cardinally-ordered list as a base and determining a proxy cardinal score for each pair of the ordinal list by computing the relative distances between the pairs in the ordinally-ordered list to quantify the distances between the rankings of the pairs in the ordinally-ordered list. To determine the proxy cardinal scores, in some implementations, one may first identify a subset of pairs that are present in both the cardinally-ordered list and the ordinally-ordered list, and the subset of pairs in the ordinally-ordered list may be assigned the cardinal scores of the cardinally-ordered list for those pairs. In some cases, the cardinal scores of the cardinally-ordered list may be weighted, for example, if the match results of a given matching AI engine or algorithm are weighted as discussed above. Then, the difference (e.g., percentage difference) of the assigned cardinal score from the evenly spaced ordinal rank of the pairs of the ordinally-ordered list may be determined. Finally, cardinal scores for each pair of the rest of the pairs in the ordinally-ordered list may be computed by using the closest difference (e.g., percentage difference) from ordinal ranking for that pair, resulting in the conversion of the ordinally-ordered list into a cardinally-ordered list. Once the ordinally-ordered list is converted into a cardinally-ordered list, the initial cardinally-ordered list and the converted cardinally-ordered list may be merged using the techniques described above.

With reference to FIG. 2, at 202, one may receive a request from a requesting device, for a cardinally-ordered list of matched pairs to be merged to an ordinally-ordered list of matched pairs. At 204, as discussed above, cardinal scores may be determined for each matched pair in the ordinally-ordered list based on the cardinal scores of the matched pairs in the cardinally-ordered list, which may result in the conversion of the ordinally-ordered list into a cardinally-ordered list. At 206, the converted cardinally-ordered list and the initial cardinally-ordered list may be merged using techniques such as but not limited to the Schulze Method. At 208, the merged list may be returned to the requesting device.

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters, dimensions, materials, and configurations described herein are meant to be exemplary and that the actual parameters, dimensions, materials, and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, netbook computer, or a tablet computer. Additionally, a computer may be embedded in a device not generally regarded as a computer but with suitable processing capabilities, including a smart phone, smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures may be shown to have fields that are related through location in the data structure. Such relationships can likewise be achieved by assigning storage for the fields with locations in a computer-readable medium that convey relationship between the fields. However, any suitable mechanism can be used to establish a relationship between information in fields of a data structure, including through the use of pointers, tags or other mechanisms that establish relationship between data elements.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
    receiving, at a processor and from a requesting device, a request to identify a subset of a plurality of candidates that match a job;
    parsing, via the processor executing at least one natural language processing technique, a description of the job to extract a first data related to the job;
    parsing, via the processor executing the at least one natural language processing technique, a description of qualifications of the plurality of candidates to extract a second data related to the plurality of candidates;
    applying, via the processor and to the first data and the second data, at least three matching algorithms, including a first matching algorithm, a second matching algorithm, and a third matching algorithm,
        the first matching algorithm configured to apply a trained machine learning-based model to produce a first indication of matching between the job and each candidate from the plurality of candidates based predominantly on a title in the first data and a listing of jobs in the second data associated with that candidate,
        the second matching algorithm configured to apply a trained machine learning-based model to produce a second indication of matching between the job and each candidate from the plurality of candidates based predominantly on skills associated with the job based on skills data in the first data and skills data in the second data associated with that candidate, the second indication of matching different from the first indication of matching,
        the third matching algorithm configured to apply a trained machine learning-based model configured to produce a third indication of matching between the job and each candidate from the plurality of candidates based on the first data and the second data;
    assigning a weight to and merging each of the first indication of matching, the second indication of matching, and the third indication of matching to produce a merged set of weighted indications of matching; and
    sending to the requesting device, an indication of the subset of the plurality of candidates that match job based on the subset of the plurality of candidates exceeding a threshold rank in the merged set of weighted indications of matching.

2. The method of claim 1, wherein the description of the qualifications of a candidate from the plurality of candidates is extracted from at least one of a resume of the candidate, a curriculum vitae of the candidate, or in a social media profile of the candidate, by the at least one natural language processing technique.

3. The method of claim 1, wherein the first data includes title terms related to a title of the job, the method further comprising:
augmenting the first data with synonyms of the title terms.

4. The method of claim 1, wherein the second data includes, for each candidate from the plurality of candidates, skill terms associated with a skill possessed by that candidate, the method further comprising:
augmenting, for each candidate from the plurality of candidates, the second data with synonyms of the skill terms possessed by that candidate.

5. The method of claim 1, wherein the second data includes at least one of information related to a job experience level of each candidate from the plurality of candidates, or information related to a job seniority level of each candidate from the plurality of candidates.

6. A method, comprising:
receiving, at a processor and from a requesting device, a request to identify one or more suitable jobs or one or more suitable candidates that match a first job or a first candidate;
parsing, via the processor executing at least one natural language processing technique and in response to the request, a description of the first job or a description of qualifications of the first candidate to extract a first data related to the first job or the first candidate;
parsing, via the processor executing the at least one natural language processing technique, descriptions of a plurality of jobs or descriptions of qualifications of a plurality of candidates to extract a second data related to the plurality of jobs or the plurality of candidates;
applying, via the processor, at least three matching algorithms to the first data and the second data to generate, respectively, at least three ordered lists,
  a first matching algorithm from the at least three matching algorithms configured to apply a trained machine learning-based model to produce a first indication of matching between (i) the description of the first job or the description of qualifications of the first candidate and (ii) the descriptions of the plurality of jobs or the descriptions of qualifications of the plurality of candidates based predominantly on (1) title terms related to the first job or a job title the first candidate is qualified for in the first data and (2) job title terms related to the plurality of jobs or job titles a candidate from the plurality of job candidates is qualified to perform,
  the second matching algorithm from the at least three matching algorithms configured to apply a trained machine learning-based model to produce a second indication of matching between the job and each candidate from the plurality of candidates based predominantly on skills associated with the job based on skills data in the first data and skills data in the second data,
each ordered list from the at least three order lists being:
  (1) an ordered list of the plurality of jobs that match the first job or the first candidate, or (2) an ordered list of the plurality of candidates that match the first job or the first candidate;
assigning a weight from a plurality of weights to each item on each ordered list from the at least three ordered lists to produce at least three weighted ordered lists;
identifying, via the processor,
  (i) a job or jobs in at least a majority of the at least three weighted ordered lists that have job ranks no less than a threshold job rank of the respective weighted ordered list of the at least three weighted ordered lists as being the one or more suitable jobs that match the first job or the first candidate, or
  (ii) a candidate or candidates in at least the majority of the at least three weighted ordered lists that have candidate ranks no less than a threshold candidate rank of the respective weighted ordered list of the at least three weighted ordered lists as being the one or more suitable candidates that match the first job or the first candidate; and
providing, via the processor and to the requesting device, a list of the one or more suitable jobs or the one or more suitable candidates.

7. The method of claim 6, wherein the threshold job rank represents a minimum job rank for the job or jobs in the majority of the at least three weighted ordered lists to be a suitable job or jobs that match the first job or the first candidate.

8. The method of claim 6, wherein the threshold candidate rank represents a minimum candidate rank for the candidate or candidates in the majority of the at least three weighted ordered lists to be a suitable candidate or candidates that match the first job or the first candidate.

9. A method, comprising:
receiving, at a processor and from a requesting device, a request for an aggregated list of jobs or candidates configured to be formed by aggregating a first list of cardinally-ranked jobs or candidates and a list of ordinally-ranked jobs or candidates, respectively;
determining, via the processor, a cardinal score for each job or candidate in the list of ordinally-ranked jobs or candidates to form a second list of cardinally ranked jobs or candidates based on (1) an ordinal score of that job or candidate in the list of ordinally-ranked jobs or candidates and (2) cardinal scores of at least two jobs or candidates in the first list of cardinally ranked jobs or candidates that are also present in the list of ordinally-ranked jobs or candidates, the determining including:
  applying, via the processor and before the receiving, at least three matching algorithms to generate at least three indications of matching between the jobs or the candidates,
    a first matching algorithm from the at least three matching algorithms configured to apply a trained machine learning-based model to produce a first indication of matching based on descriptions of the jobs or the candidates,
    the second matching algorithm from the at least three matching algorithms configured to apply a trained machine learning-based model to produce a second indication of matching based predominantly on skills associated with the jobs or the candidates;
  assigning a weight from a plurality of weights to each indication of matching from the at least three indications of matching to produce a set of weighted indications of matching; and
  identifying, after the assigning and via the processor, the first list of cardinally ranked jobs or candidates and the second list of cardinally ranked jobs or candidates when at least a majority of the at least three weighted indications of matching indicates matches,
applying, via the processor, a list-merging algorithm to the first list of cardinally ranked jobs or candidates and the second list of cardinally ranked jobs or candidates to form the aggregated list of jobs or candidates; and sending, via the processor, the aggregated list of jobs or candidates to the requesting device.

10. The method of claim 9, wherein the list-merging algorithm is the Schulze method.

* * * * *